Figure 1:
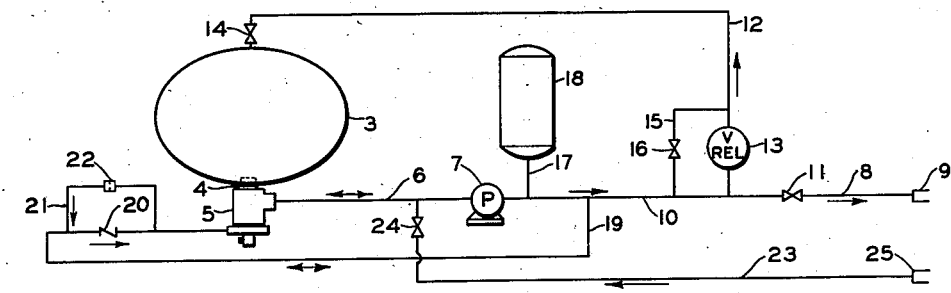

May 19, 1953    T. A. ST. CLAIR    2,638,924
AUTOMATIC TANK VALVE
Filed Nov. 28, 1949

INVENTOR.
T. A. ST CLAIR
BY Hudson & Young
ATTORNEYS

Patented May 19, 1953

2,638,924

UNITED STATES PATENT OFFICE 2,638,924

AUTOMATIC TANK VALVE

Theodore A. St. Clair, South Euclid, Ohio, assignor to Phillips Petroleum Company, a corporation of Delaware Application November 28, 1949, Serial No. 129,741

14 Claims. (Cl. 137—641)

This invention relates to an apparatus for handling liquids. In one of its aspects, this invention relates to a valve so constructed and adapted as to be employed in conjunction with a liquefied gas handling system.

In the liquefied petroleum gas industry, it is common practice to transport liquefied petroleum gases such as butane and propane via a tank car or a tank truck. The problem of quickly and safely loading or unloading a tank car or truck with such liquids is one of paramount importance because, in many instances, the success of a liquefied petroleum gas business is dependent upon a quick and safe servicing of many small users of the liquefied gas. Further, transporting a liquefied, highly inflammable petroleum gas presents many problems of safety. Thus, broken or ruptured transfer lines, leaks, faulty pumps, etc. represent potential explosive and fire hazards which may be unnoticed by the operator of the tank car or truck until the fire or explosion has occurred. In view of these and other considerations, it has been one of the objects of the liquefied petroleum gas industry to secure and devise a simple, safe and substantially automatic apparatus for loading and unloading liquefied petroleum tank cars and trucks.

It has now been found that liquids can be quickly and safely loaded into and unloaded from a tank by providing a valve located inside the tank which is adapted to be opened and closed by a motor which is responsive to major pressure changes in a discharge line handling liquids flowing from the tank and yet will not alternately open and close with normal pulsations in pressure in said line. In this manner, any sudden drop in pressure in such a line as determined by a break therein will cause the valve to suddenly close and thereby prevent escape of excessive amounts of liquids through the broken line. Further, the valve will automatically close upon the cessation of flow through the discharge line without any further attention from an operator.

It has also been found hat gases which may accumulate in the line connected to said tank will often cause a loading and unloading pump associated with said line to become inoperative and that such gases can be bled from the line and pump and liquids concomitantly permitted to flow from a tank into the pump and line by providing a gas bleed-off means and valve actuating means in operative connection with the quick-closing, pressure responsive valve located inside the tank.

Further, it has been found that a quick-closing valve can be so constructed and arranged that a liquid washing action is provided to maintain the working parts of the valve free of any clogging materials that may tend to lodge thereon.

Still further, it has been found that a quick-closing valve can be constructed so that the valve can be located inside a tank containing liquids and the motor operating said valve can be located outside said tank with a relatively easily frangible connection therebetween so that any damaging blows upon the external motor can cause it to be broken apart from said valve leaving the latter in place inside the tank to prevent escape of liquids.

The primary object of this invention is to provide safe equipment for handling liquefied gases, or other liquids that will be as safe as can be devised, and that will comply with the "Standards of the National Bureau of Fire Underwriters NBFU Pamphlet No. 58" and all similar standards of safety.

Another object is to provide a suitable quick-closing valve to use in a system handling liquefied gases or other liquids.

Another object is to provide a quick-closing pressure responsive valve which is responsive to major pressure changes but not to minor pressure fluctuations.

Still another object is to provide a quick-closing valve which is self-cleaning and is adapted to prevent accumulations of clogging materials therein.

Numerous other objects and advantages will be apparent to those skilled in the art upon reading the accompanying specification, claims and drawings.

Figure 2:
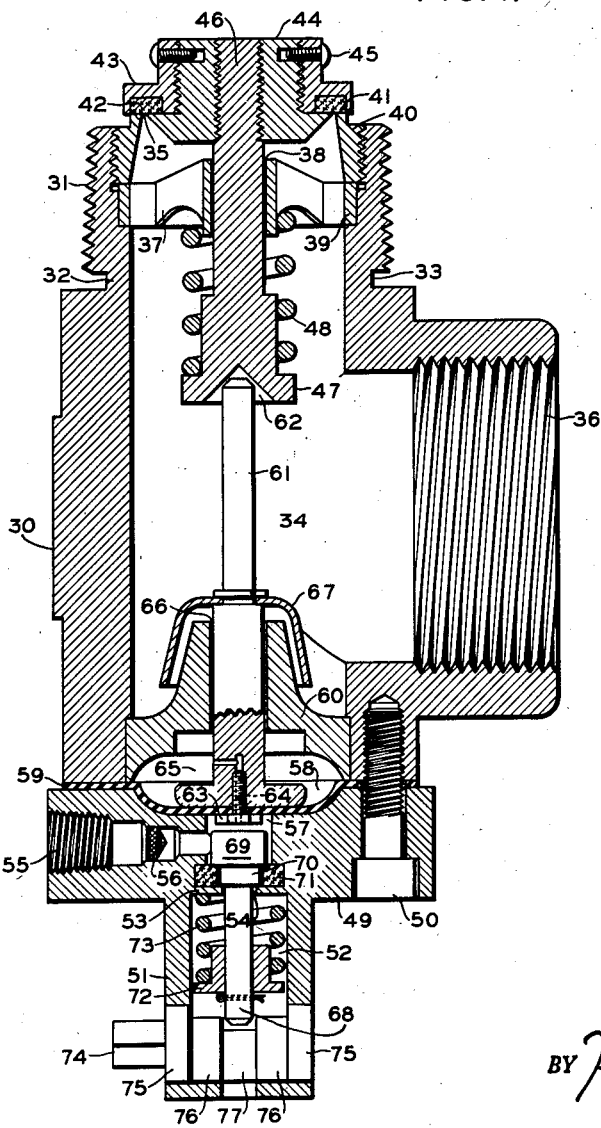

In the attached drawings, Figure 1 represents diagrammatically the liquid handling system according to one of the preferred embodiments of this invention. Figure 2 represents a quick-closing valve especially adapted for use in the system of Figure 1.

Referring to Figure 1, the numeral 3 represents a tank which can be mounted on a vehicle of any suitable type or a permanent fixed support and which is especially suitable for containing liquefied gases, particularly liquefied petroleum gases such as butane, propane etc. Tank 3 can be equipped with appurtenant devices such as a vapor pressure relief, drain, liquid level gage, pressure gage, etc. as described in my co-pending appllication, Serial No. 598,812, filed June 11, 1945, now Patent No. 2,538,806. In an outlet 4 of the tank 3 is located quick-closing valve 5. Liquid transfer line 6 connects valve 5 with pump 7 which can be any type adapted to pump liquefied gases. Pump 7 is connected to unloading hose 8 and filling coupling 9 by discharge line 10 containing valve 11. Liquid return line 12 connects discharge line 10 with tank 3 and contains a differential pressure flow regulator 13 and a valve 14. Flow regulator 13 is provided with by-pass line 15 containing manually operated valve 16.

Surge chamber 18 can also be connected to discharge line 10 via line 17. Surge chamber 18 can be any type of tank, vessel or pipe capable of maintaining a cushion of gas in the upper portion thereof to dampen pulsations of pressure.

Pilot line 19 is provided between discharge line 10 and valve 5. Check valve 20 is so situated in pilot line 19 as to prevent liquid flow from valve 5 to liquid discharge line 10. By-pass line 21 containing orifice 22 can be provided to by-pass liquid around check valve 20. Orifice 22 can be of any type which will suitably restrict the liquid flow through by-pass line 21. It can comprise a pair of flanges and a pierced plate situated between the flanges, a drilled plug inserted in line 21, a variable opening iris-type diaphragm or throttling type valve such as a globe valve, etc.

Attached to liquid transfer line 6 is loading line 23 containing valve 24. Loading coupling 25 is attached to the end of loading line 23 in order that the line can be connected to a source of liquid (not shown) when filling tank 3.

In Figure 2 is shown a quick-closing valve designated generally as valve 5 of Figure 1. This valve is comprised of a valve housing 30 provided exteriorly with a connecting means such as threads 31 and a weakened relatively easily frangible portion 32 formed by encompassing valve housing 30 with groove 33. Valve housing 30 is provided with chamber 34 having openings 35 and 36. At one end of valve housing 30, there is provided a spider 37 having a centrally located opening 38 therein and held in an inner recess 39 by a valve seat 40. Valve seat 40 is provided with a seating surface 41 against which presses sealing means 42 mounted in cap ring 43 which in turn is removably mounted on valve head 44 and is held firmly in place by screws 45. Valve stem 46 is likewise removably attached to valve head 44 and extends through opening 38 in spider 37 which maintains valve head 44 in proper alignment so that sealing means 42 will seat properly on valve seating surface 41 of valve seat 40. Although described as comprising numerous parts in order to be more easily assembled it is obvious that valve head 44 can be constructed so as to be a single integral part and even sealing means 42 can be made a part thereof. Also, it is not necessary that spider 37 and valve seat 40 be constructed so as to be removable as they can be formed so as to be a non-removable part of valve housing 30.

The end of valve stem 46 opposite valve head 44 is provided with a shoulder 47. Spring 48 is provided to press against shoulder 47 and spider 37 in order to bias valve head 44 into a normally closed position.

The end of valve housing 30 opposite valve head 44 is closed by plate 49 held in place against housing 30 by bolts or screws 50. Plate 49 is provided with a bonnet 51 having a recess 52 and a guide portion 53 which is pierced at 54. Plate 49 is also provided with inlet 55 into which can be inserted a strainer 56 for the passage of fluids into and out of inner chamber 57 of plate 49. The inner surface of plate 49 can be formed to provide a recess 58 adaptable to receive flexible diaphragm 59 which is located at and held in place across the outer end of valve housing 30 by plate 49.

Valve housing 30 is provided with diaphragm stem guide 60 having an opening therein suitably arranged to align diaphragm stem 61 with recess 62 in valve stem 46. Diaphragm stem guide 60 is adapted to form a seal across chamber 34 next to diaphragm 59 so that the only avenue of flow of liquid from chamber 65 into chamber 34 is through a passageway 66. Diaphragm stem 61 is attached at one end to diaphragm 59 by means of diaphragm bolt 63. Diaphragm bolt 63 is provided with a passageway 64 which opens into a space 65 in the outer end of stem guide 60. Stem guide 60 is so constructed as to provide a loose fit around diaphragm stem 61 and thereby permit a passageway 66 between stem guide 60 and diaphragm stem 61. Diaphragm stem 61 is further provided with a shield 67 which can be of such structure as to fit loosely over the inner surface of stem guide 60 so as to form a passageway therebetween.

Located in the recess 52 of valve bonnet 51 is push pin 68 having a push pin head 69 adapted to coact with diaphragm bolt 63. Push pin head 69 can have a shoulder 70 adapted to fit inside of sealing means 71 and to seat against guide portion 53 in order to prevent damage to sealing means 71 by push pin head 69 should excessive seating force be applied to push pin head 69. At the opposite end of push pin 68 is situated a spring retainer 72 coacting with spring 73 which is fitted to hold push pin head 69 against sealing means 71 so as to form a tight seal therebetween. Thus, push pin head 69 and sealing means 71 coact to form a valve between pressure chamber 57 and recess 52 in bonnet 51. Valve bonnet 51 at its outer end is formed to receive an actuating member designated generally as 74 which is adapted to coact with the end of push pin 68. Actuating member 74 can be comprised of annular bearing shoulders 75 fitted into bonnet 51 as shown. Shoulder 77 of actuating member 74 is adapted to coact with the end of push pin 68 while shoulders 76 are adapted to coact with the sides of push pin 68 to hold actuating member 74 in place in bonnet 51 when push pin head 69 is seated on sealing means 71. When push pin head 69 is advanced to an unseated position with respect to sealing means 71, the force exerted by spring 73 through push pin 68 on shoulder 77 will hold actuating member 74 in operative position. Shoulder 77 is located eccentrically from the axes of bearing shoulders 75 so that it exerts a cam action against push pin 68 when actuating member 74 is rotated in bonnet 51.

In setting forth the operation of the liquid handling system illustrated in Figure 1, assume first that tank 3 is full and that it is to be unloaded. Assume also that the valve 5 of Figure 1 corresponds in structure and operation to the valve shown in Figure 2. In accomplishing such an operation, valves 11, 16 and 24 are closed and valve 14 is opened. Pump 7 is then started and actuating member 74 is rotated in valve bonnet 51 so that shoulder 77 advances push pin 68 to permit the escape of gases from liquid transfer line 6 and pump discharge line 10 through pilot line 19, screen 56 and out between push pin head 69 and sealing means 71. In advancing push pin 68, push pin head 69 contacts diaphragm bolt 63 and thereby unseats valve head 44 permitting liquid to flow from tank 3 between seating surface 41 and sealing means 42 into chamber 34 and thence out opening 36 to liquid transfer line 6 and pump 7. The pump is thereby primed and will pump liquid under increased pressure out discharge line 10 and, at the same time fill pilot line 19 with liquid under pressure. When this occurs, actuating member 74 is rotated to a position such that spring 73 can return push pin head 69 to a seated position with respect to sealing means 71. The liquid under pressure in pilot line 19 will then push against diaphragm 59 thereby causing diaphragm stem 61 to coact with valve stem 46 to maintain valve head 44 in an unseated position. Valve 5 will remain in an open position as long as pump 7 operates to maintain a sufficient fluid pressure in discharge line 10 and pilot line 19. Valve 11 can then be opened to permit liquid to flow through hose 8.

Pressure relief valve 13 is closed at normal pump discharge pressures but is adjusted to open when the pressure in discharge line 10 increases above a predetermined point thereby permitting liquid from line 10 to discharge back into the top of tank 3 via line 12 and valve 14. Thus, if valve 11 is inadvertently closed while pump 7 is running or if the container being filled becomes liquid full, the resultant tendency of pump 7 to build up excessive pressure in line 10 will be prevented.

When the desired amount of fluid has been pumped out of tank 3, pump 7 is shut off and valve 11 closed. Fluid in discharge line 10 will bleed backwardly through pump 7 thereby decreasing the pressure in discharge line 10 and pilot line 19. Fluid will also bleed through passageway 64 in diaphragm bolt 63 to also decrease the pressure in discharge line 10 and pilot line 19. Pressure in line 10 can also be decreased by opening by-pass valve 16. Check valve 20 then closes and fluid pressure in chamber 57 remains high until fluid passes through orifice 22 and line 21 back into pilot line 19 as well as through passageway 64 in diaphragm bolt 63 into valve chamber 34. The resulting equalization of pressure across diaphragm 59 permits spring 48 to seat valve head 44 thereby closing valve 5 (Figure 1) until such time as pump 7 is again started or until actuating member 73 is again employed.

Whenever it is desired to subsequently pump liquid from tank 3, it is only necessary to start pump 7 and open valve 11 since liquid transfer line 6, pump discharge line 10 and pilot line 19 will remain liquid full and it will usually not be necessary to bleed gases therefrom. Valve 5 will then open automatically in response to an increase in pressure in pilot line 19 and it will not be necessary to employ actuator 74 to manually open the valve. Thus, when the various transfer lines are full of liquid, starting and stopping pump 7 will automatically open and close valve 5.

When it is desired to fill tank 3, loading coupling 25 is attached to a source of fluid and tank 3 can be filled by pressuring liquid through loading line 23, fluid transfer line 6 and then into valve chamber 34 of valve 5 thereby forcing open valve head 44. Valve 5 will remain in open position as long as sufficient pressure is maintained in valve chamber 34 to overcome the opposing closing action of spring 48 and pressure against valve head 44. As an alternative filling means, valves 14 and 16 can be opened and with or without the aid of pump 7, fluid can be passed into tank 3 via lines 23, 6, 10, 15 and 12.

It will be apparent that, in view of the foregoing description, valve 5 will remain in open position only as long as pump 7 maintains sufficient pressure in discharge line 10, pilot line 19 and chamber 57 to permit the differential pressure across diaphragm 59 to successfully overcome the tendency of spring 48 plus any differential pressure across valve head 44 to seat valve head 44. Should any line, valve etc. external to valve 5 rupture or develop a serious leak, the resulting drop in pressure in pilot line 19 and chamber 57 will cause valve 5 to immediately close and remain closed until the operator of the system corrects the leak or rupture. For example, if unloading hose 8 is ruptured or if unloading coupling 9 becomes unfastened, as occasionally happens, the pressure in discharge line 10 and pilot line 19 will suddenly decrease thereby quickly closing valve 5.

In order to permit the quick-closing action of valve 5 to function when necessary due to a line break, orifice 22 in line 21 can be provided around check valve 20. Orifice 22 can be adjusted in size to permit sufficient liquid to flow from chamber 57 of valve 5 back into pilot line 19 so that valve 5 will quickly close and yet not be of such large size that ordinary pressure fluctuations in pilot line 19 will cause valve 5 to continually open and close responsive to those pressure fluctuations. Thus, orifice 22 serves not only as a bleed-back from chamber 57 of valve 5 in case of a line break but also as a dampening device to prevent valve 5 from opening and closing with normally occurring pressure fluctuations in discharge line 10.

Further, the quick-closing action of valve 5 is assisted in case of a line break, by providing passageway 64 through diaphragm bolt 63 to permit fluid to bleed therethrough and thereby decrease the pressure differential across diaphragm 59 permitting valve head 44 to seat. Thus, for example, if fluid transfer line 6 breaks, the pressure in valve chamber 34 decreases and the pressure in pressure chamber 57 will likewise decrease because fluid will pass therefrom through passageway 64 to valve chamber 34. When the pressure in pressure chamber 57 has decreased sufficiently to allow spring 48 to seat valve head 44, the escape of liquids from tank 3 will cease.

With respect to valve 5 as shown generally in Figure 1 and in detail in Figure 2, it is apparent that several advantages are derived from employing a valve having such structure. Thus, for example, provision of passageway 64 in diaphragm bolt 63 permits the fluid being pumped to continually flow through passageway 64 into space 65 and thence out through passageway 66 and around the inner surface of shield 67 into valve chamber 34. In this manner, any dirt or foreign matter which would normally lodge around diaphragm stem 61 and stem guide 60 will be washed out of the valve thereby preventing stoppage of the action of diaphragm 59 in closing or opening valve head 44. The passage of fluid through passageway 64 etc. also serves to maintain a flow of fluid through pilot line 19 to prevent it from clogging.

Further, it is apparent that since valve head 44 and valve seat 40 and sealing means 42 are situated inside tank 3, then the only part of valve 5 exposed to blows and injury from external sources is the motor section represented by diaphragm 59, push pin 68 and bonnet 51. As noted previously, valve housing 30 is provided with a structurally weakened portion 32 adapted to be broken through such section with application of less force to the external part of valve 5 than would be necessary to completely dislodge the entire valve 5 from tank 3. Thus, since diaphragm stem 61 is fitted removably into valve stem 46, a blow which would normally break valve 5 entirely away from tank 3 will only break off the motor section of the valve leaving valve head 44 and valve seat 40 inside the tank to prevent escape of liquid therefrom.

It is also apparent that when push pin 68 is advanced to move diaphragm 59, the forward surface of push pin head 69 will substantially seal passageway 64 through diaphragm bolt 62 thereby preventing the escape of liquid from chamber 34 while gas is being bled through inlet 55, chamber 51 and recess 52 in valve bonnet 51.

While the invention has been described in connection with a present preferred embodiment thereof, it is to be understood that this description is illustrative only and is not intended to limit the invention, the scope of which is defined by the appended claims.

I claim:

1. A quick-closing valve comprising in combination a valve body having a chamber, a main inlet and outlet to said chamber, an opening in said chamber opposite said inlet, a valve normally closing said main inlet, said valve body having an easily frangible section adjacent said valve, a spring biasing said valve to a closed position, a valve stem attached to said valve and extending into said chamber, a bonnet across said opening in said chamber, a flexible diaphragm disposed between said chamber and said bonnet thereby forming a wall of said chamber opposite said valve, a diaphragm stem attached at one end to said diaphragm and received at the other end in said valve stem extending in said chamber, a diaphragm stem guide plate extending across said chamber parallel and adjacent to said diaphragm, said guide plate having an opening therein adapted to fit loosely about said diaphragm stem and having a recess therein adapted to receive said diaphragm in a flexed position, said bonnet having a recess therein adapted to receive said diaphragm when flexed in a position away from said guide plate, said bonnet having an opening therethrough connecting to said recess in said bonnet, a manually operated push pin extending into said opening in said bonnet and adapted to be normally seated against a sealing means to thereby form a pressure chamber in a portion of said opening in said bonnet between said sealing means and said diaphragm, said push pin being adapted to be manually advanced to move said diaphragm and thereby cause said diaphragm stem and said valve stem to coact to open said valve and at the same time being adapted to then be in an unseated position with respect to said sealing means, a pressure inlet to said pressure chamber in said bonnet, a fluid passageway through said diaphragm connecting said pressure chamber on one side of said diaphragm with said recess in said diaphragm stem guide plate and a shield rigidly attached to said diaphragm stem adjacent to side of said valve plate internal to said chamber in said valve body and adapted to form a fluid passageway connecting said opening in said diaphragm stem guide plate to said chamber of said valve body.

2. The apparatus of claim 1 having a pilot conduit attached to said pressure inlet, a check valve in said pilot conduit situated to permit flow through said pilot conduit into said pressure inlet, a by-pass conduit around said check valve and connecting to said pilot conduit on each side of said check valve and a flow restricting orifice in said by-pass conduit.

3. A quick-closing valve comprising in combination a valve body having a chamber, a main inlet and outlet to said chamber, an opening in said chamber, a valve normally closing said main inlet, said valve body having an easily frangible section adjacent said valve, a means biasing said valve to a closed position, a bonnet across said opening in said chamber, a flexible diaphragm disposed between said chamber and said bonnet thereby forming a wall of said chamber, means connecting said diaphragm and said valve, a plate extending across said chamber adjacent to said diaphragm and having an opening therein adapted to fit loosely about said means connecting said diaphragm and said valve, said bonnet having an opening therein opposite said diaphragm, a push pin extending into said bonnet opening and adapted to be normally seated against a sealing means to thereby form a pressure chamber in a portion of said bonnet opening between said sealing means and said diaphragm, said push pin being adapted to be advanced to move said diaphragm and to thereby cause said valve to open and at the same time adapted to then be in an unseated position with respect to said sealing means, a pressure inlet to said pressure chamber in said bonnet, a fluid passageway through said diaphragm and a shield attached to said means connecting said diaphragm and said valve.

4. A quick-closing valve comprising in combination a valve body having a chamber, a main inlet and outlet to said chamber, a valve normally closing said main inlet, a flexible diaphragm forming one wall of said chamber, means connecting said diaphragm and said valve, a plate extending across said chamber adjacent to said diaphragm and having an opening therein adapted to fit loosely about said means connecting said diaphragm and said valve, a bonnet situated adjacent to said diaphragm on the opposite side from said chamber, said bonnet having a pressure chamber therein open to said diaphragm, a push pin extending through said bonnet into said pressure chamber and adapted to be normally seated against a sealing means to prevent leakage from said pressure chamber, said push pin being further adapted to be advanced to move said diaphragm to thereby cause said valve to open and at the same time to then be in an unseated position with respect to said sealing means, a pressure inlet to said pressure chamber and a fluid passageway through said diaphragm.

5. A quick-closing valve comprising in combination a valve body having a chamber, a main inlet and outlet to said chamber, a valve normally closing said main inlet, a flexible diaphragm forming one wall of said chamber, means connecting said diaphragm and said valve, a bonnet situated adjacent to said diaphragm on the opposite side from said chamber, said bonnet having a pressure chamber therein open to said diaphragm, a push pin extending through said bonnet into said pressure chamber and adapted to be normally seated against a sealing means to prevent leakage from said pressure chamber, said push pin being further adapted to be advanced to move said diaphragm to thereby cause said valve to open and at the same time to then be in an unseated position with respect to said sealing means, and a pressure inlet to said pressure chamber.

6. A quick-closing valve comprising in combination a valve body having a chamber, a main inlet and outlet to said chamber, a valve normally closing said main inlet, a flexible diaphragm forming one wall of said chamber, means connecting said diaphragm with said valve, a plate extending across said chamber and adjacent to said diaphragm and having an opening therein adapted to fit loosely about said means connecting said diaphragm and said valve, a bonnet situated adjacent to said diaphragm on the opposite side from said chamber, said bonnet having a pressure chamber therein open to said diaphragm, a manual means adapted to coact with said diaphragm to cause said valve to open, a pressure inlet to said pressure chamber, and a fluid passageway through said diaphragm.

7. The apparatus of claim 5 having a shield attached to said means connecting said diaphragm and said valve.

8. A quick-closing valve comprising in combination a valve body having a chamber, a main inlet and outlet, an inlet valve normally closing said main inlet, a flexible diaphragm forming one wall of said chamber, means coacting with said diaphragm to cause said inlet valve to open when the diaphragm is moved toward the valve, a bonnet situated adjacent to said diaphragm on the opposite side from said chamber, said bonnet having a pressure chamber therein open to said diaphragm and open externally to said bonnet, an auxiliary valve normally closing said external opening in said pressure chamber and adapted when opened a predetermined amount to coact with said diaphragm to cause said inlet valve to open and a pressure inlet to said pressure chamber.

9. A quick-closing valve comprising in combination a valve body having a chamber, a main inlet and outlet to said chamber, an inlet valve normally closing said main inlet, a diaphragm forming one wall of said chamber, means coacting with said diaphragm to cause said inlet valve to open when the diaphragm is moved toward the valve, a pressure chamber on one side of said diaphragm, an auxiliary valve normally closing a passageway from said pressure chamber to a point external of said pressure chamber, said auxiliary valve adapted when opened a predetermined amount to coact with said diaphragm to cause said inlet valve to open, and a pressure inlet to said pressure chamber.

10. A quick-closing valve comprising in combination a valve body having a chamber, a main inlet and outlet, an inlet valve normally closing said main inlet, a flexible diaphragm forming one wall of said chamber, means coacting with said diaphragm to cause said inlet valve to open when the diaphragm is moved toward the valve, a bonnet situated adjacent to said diaphragm on the opposite side from said chamber, said bonnet having a pressure chamber therein open to said diaphragm and open externally to said bonnet, an auxiliary valve normally closing said external opening in said pressure chamber and adapted when opened a predetermined amount to coact with said diaphragm to cause said inlet valve to open, a pressure inlet to said pressure chamber, a conduit containing a check valve connected to said pressure inlet, a by-pass conduit around said check valve and a flow restricting means in said by-pass.

11. A quick-closing valve comprising in combination a valve body having a chamber, a main inlet and outlet to said chamber, an inlet valve normally closing said main inlet, a diaphragm open on one side to said chamber and operatively connected to said inlet valve, a pressure chamber open to the other side of said diaphragm, means coacting with said diaphragm to cause said inlet valve to open, means for opening said pressure chamber to a point external of said pressure chamber, said means adapted to move said diaphragm toward the main inlet valve to unseat said valve when said pressure chamber is opened a predetermined amount, a pressure inlet to said pressure chamber, a check valve connected to said pressure inlet, and a flow restricting by-pass around said check valve.

12. A quick-closing valve comprising in combination a valve body having an inlet and an outlet, said valve body having a weakened portion formed therein at its inlet end whereby a severe shock applied to said valve body will cause the valve body to break away at said weakened portion with resulting disengagement and closure of said valve, an inlet valve assembly disposed within the inlet including a valve seat, a valve head, a valve stem attached to said valve head, and means urging said valve head into engagement with said valve seat, a diaphragm forming a wall of said valve body across the end thereof opposite said valve head, a diaphragm stem within the valve body, attached at one end to said diaphragm and detachably engaging said valve stem so as to move said valve away from said valve seat when a force acts upon the diaphragm, means for aligning said diaphragm stem with said valve stem, a bonnet situated adjacent to said diaphgram on the side opposite the diaphragm stem, said bonnet having a pressure chamber therein open to said diaphragm and open externally to said bonnet, an auxiliary valve normally closing said external opening in said pressure chamber and adapted when opened a predetermined amount to coact with said diaphragm to cause said inlet valve to open, and a pressure inlet to said pressure chamber.

13. A quick-closing valve comprising in combination a valve body having an inlet and an outlet, said inlet and said outlet each being adapted to provide connecting means, an inlet valve assembly including a valve seat disposed in said inlet, a valve head, a valve stem connected at one end to said valve head and having a centrally concave recess at its opposite end, a spring urging said valve head inwardly with respect to the valve body and into engagement with the valve seat, a diaphragm forming a wall of said valve body across the end thereof opposite said valve head, a diaphragm stem within said valve body attached at one end to said diaphragm, and by fitting into the recess in the valve stem detachably engaging said valve stem to move said valve away from said seat when the diaphragm moves toward the valve seat, a diaphragm stem guide for aligning said diaphragm stem with the recess in said valve stem, a bonnet situated adjacent to said diaphragm on the side opposite the diaphragm stem, said bonnet having a pressure chamber therein open to said diaphragm, a push pin extending through said bonnet into said pressure chamber and adapted to be normally seated against a sealing means to prevent leakage from said pressure chamber, said push pin being further adapted to be advanced to move said diaphragm to thereby cause said valve to open and at the same time to then be in an unseated position with respect to said sealing means, a pressure inlet to said pressure chamber, a fluid passageway through said diaphragm, and said valve body having a circumferential recess formed therein adjacent to the inlet connecting means to weaken said valve body whereby a severe shock applied to the valve body will cause said valve body to break away at said recess with resulting disengagement of the valve stem from the diaphragm stem and closure of said valve.

14. A quick-closing valve comprising in combination a valve body having a chamber, a main inlet and an outlet to said chamber, both being threaded to provide connecting means, a third opening in said chamber opposite the chamber inlet, an inlet valve assembly disposed in said inlet including a valve seat, a valve head, a valve stem connected to said valve head and provided at its end opposite the valve head with a shoulder and a centrally concave recess, a spider within the valve chamber adjacent to the valve head, a spring between said valve stem shoulder and said spider and around said valve stem urging said valve head inwardly into engagement with said valve seat, a bonnet across the third opening in said chamber, a flexible diaphragm disposed within said chamber across said third opening and adjacent to said bonnet, a diaphragm stem within said valve chamber attached at one end to said diaphragm and by fitting into the recess in the valve stem detachably engaging said valve stem to move said valve away from said valve seat when the diaphragm stem is moved, a diaphrgam stem guide fitting loosely about the diaphgram stem for aligning said diaphragm stem with the recess in said valve stem, said bonnet having an opening therein opposite said diaphragm, a push pin extending into said bonnet opening and adapted to be normally seated against a sealing means to thereby form a pressure chamber in a portion of said bonnet opening between said sealing means and said diaphragm, said push pin being adapted to be advanced to move said diaphragm and to thereby cause said valve to open and at the same time adapted to then be in an unseated position with respect to said sealing means, a pressure inlet to said pressure chamber in said bonnet, a fluid passageway through said diaphragm, a shield attached to the diaphragm stem within the valve body, and said valve body having an easily frangible section adjacent to said valve to weaken said valve body whereby a severe shock applied to the valve body will cause said valve to break away with resulting disengagement of the diaphragm stem from the valve stem and closure of said valve.

THEODORE A. ST. CLAIR.

References Cited in the file of this patent

UNITED STATES PATENTS

| Number | Name | Date |
|---|---|---|
| 1,555,265 | Carill | Sept. 29, 1925 |
| 1,647,189 | Mueller et al. | Nov. 1, 1927 |
| 1,794,155 | Davis, Jr. | Feb. 24, 1931 |
| 1,861,742 | Hand | June 7, 1932 |
| 2,247,309 | Robinson | June 24, 1941 |